United States Patent [19]

Berry, III et al.

[11] Patent Number: 5,246,180

[45] Date of Patent: Sep. 21, 1993

[54] REEL SUPPORT WITH HORIZONTAL AND VERTICAL ADJUSTMENT

[75] Inventors: William M. Berry, III, Newnan; Doyle B. Charles, Carrollton; Michael F. Flagg, Newnan, all of Ga.

[73] Assignee: Southwire Company, Carrollton, Ga.

[21] Appl. No.: 812,383

[22] Filed: Dec. 23, 1991

[51] Int. Cl.⁵ .................... B65H 49/00; D01H 7/16
[52] U.S. Cl. .................. 242/54 R; 242/68.4; 242/129.51
[58] Field of Search .......... 242/54 R, 58.6, 68, 242/68.1, 68.4, 64, 129.51

[56] References Cited

U.S. PATENT DOCUMENTS

| 1,874,904 | 8/1932 | Crafts | 242/58.6 |
|---|---|---|---|
| 2,641,413 | 6/1953 | Bruestle | 242/54 R |
| 2,652,207 | 9/1953 | Goedken | 242/58.6 |
| 4,098,468 | 7/1978 | Skalleberg | 242/54 R |
| 4,679,743 | 7/1987 | Dallmaier | 242/54 R |
| 4,706,905 | 11/1987 | Torres | 242/68.4 |

FOREIGN PATENT DOCUMENTS

| 1038453 | 9/1958 | Fed. Rep. of Germany | 242/58.6 |
|---|---|---|---|
| 1263889 | 3/1968 | Fed. Rep. of Germany | |
| 1961378 | 6/1970 | Fed. Rep. of Germany | |
| 2519070 | 6/1975 | Fed. Rep. of Germany | 242/54 R |
| 888458 | 1/1962 | United Kingdom | |
| 90/15771 | 12/1990 | World Int. Prop. O. | |

Primary Examiner—Daniel P. Stodola
Assistant Examiner—John F. Rollins
Attorney, Agent, or Firm—Stanley L. Tate; James W. Wallis, Jr.; George C. Myers, Jr.

[57] ABSTRACT

A cable payoff apparatus for the controlled payout of a continuous cable from a reel comprises a pair of laterally movable housings which support a reel on a pair of pintles. A power mechanism is provided for laterally moving the housings toward and away from one another. The housings are also supported for vertical movement along a pair of upstanding masts and a power mechanism is provided for simultaneously moving the housings up and down. The pintles are independently supported for both vertical and horizontal movement relative to the housings and are thereby independently adjustable by power mechanisms into alignment with openings on the axis of the reel of cable.

27 Claims, 4 Drawing Sheets

REEL SUPPORT WITH HORIZONTAL AND VERTICAL ADJUSTMENT

FIELD OF THE INVENTION

The present invention relates to winding and reeling apparatus and more particularly to an apparatus for the controlled payout of a continuous strand from a reel, especially a continuous electrical conductor wound on a large heavy reel.

DESCRIPTION OF THE PRIOR ART

In the manufacture of electrical cable and other continuous strand products, it is often necessary to handle large, heavy reels of the cable or strand product during manufacturing operations. It is also necessary to handle these large reels during storage and shipping operations and when using the product, such as, for instance, in cable laying operations for paying out the cable from a reel.

In some cases, a reel wound with cable may have a diameter ranging up to six to ten feet or more and a weight of several thousand pounds. In order to lift and handle such large and heavy reels, it is not only necessary to provide an apparatus that can support the weight of the reel, but also to provide an apparatus that is capable of being adjusted to accommodate various reel diameters and axial lengths.

The reels on which the cable is wound are usually constructed of a cylindrical reel drum to the ends of which are affixed circular side flanges or plates. The circular flanges are usually provided with central bores or openings which define the reel axis and which are adapted to be engaged by the spindles or pintles of a winding and reeling apparatus. Especially in the case of very large and heavy reels, it frequently happens that the openings which define the reel axis are misaligned so that the reel axis may be inclined with respect to the supporting surface or to the pintle axis of the winding and reeling apparatus.

The foregoing problems associated with lifting and handling large, heavy reels of cable are well known in the art and are described in more detail in U.S. Pat. No. 4,098,468 to Skalleberg, the disclosure of which is incorporated herein by reference. The Skalleberg patent discloses a cable reeling device for handling a double-flanged reel with central reel openings in each flange aligned with the reel axis. According to this patent, the spindles of the reeling device are freely movable vertically and horizontally within a zone around the intended position of the reel axis so that, as the spindle supports are moved toward the reel flanges, the spindles can be manipulated and inserted into the reel openings regardless of the degree of misalignment of the openings from the reel axis. This freely movable feature of the spindles is provided by resilient and slidable couplings between the spindles and the reel support frame. Hydraulic power means are provided for moving the spindles in the vertical direction only, but no power means are disclosed or contemplated for moving the spindles in the horizontal direction. Horizontal positioning of the spindles relative to the reel openings is accomplished by a combination of tapered spindles and manual manipulation of the spindles while the spindle supports are being moved toward one another and toward the respective opening in the reel flanges. Such a manual procedure for aligning the spindles creates a dangerous environment for the operators of the reeling device and could result in serious injury. Thus, the advantage of having manually manipulatable, freely movable spindles is far outweighed by the potential danger of personal injury to operating personnel.

The Skalleberg reeling device is also provided with two hydraulic piston/cylinder power arrangements for moving the spindle supports toward and away one another and for raising and lowering the spindles relative to the spindles support housings. Such hydraulic power means are disadvantageous in that precise incremental control of the position of the spindles is difficult to achieve.

A further disadvantage of the Skalleberg reeling device is that once a heavy reel is lifted from the floor surface by the device, the spindle support housing is vertically locked in place on the frame and cannot be vertically adjusted relative to the frame unless the reel is again lowered to the floor surface. It would be desirable to have the capability of vertically positioning the reel axis at a desired height before locking the spindle support housing to the frame.

SUMMARY OF THE INVENTION

In view of the foregoing limitations and shortcomings of the prior art reeling apparatus, as well as other disadvantages not specifically mentioned above, it should be apparent that there still exists a need in the art for a cable reeling/payoff apparatus that overcomes those disadvantages and is particularly safe to operate.

The apparatus of the present invention comprises right and left housing or portal assemblies, each of which is mounted for vertical movement on a respective upstanding mast supported on a respective right and left base assembly. Each housing assembly carries a respective spindle or pintle assembly having a tapered pintle which is adjustable relative to the housing assembly in both the vertical and horizontal directions and which is also pivotally suspended from the pintle assembly for arcuate movement about an axis spaced above the pintle axis.

A portal traverse assembly is connected between the right and left housing assemblies and is provided with power means for moving the housing assemblies and their respective masts and base assemblies toward and away from one another. The traverse assembly is used first to enlarge the spacing between the pintles so as to accommodate between the left and right housing assemblies a reel having a given dimension between its flanges and then to decrease the spacing between the pintles to cause the pintles to engage in the reel flange openings. If the pintle axes are misaligned with the reel openings, the power means for the pintle assemblies may be operated to move the pintles both vertically and horizontally into alignment with the reel openings before the portal traverse assembly is operated to move the left and right housing assemblies toward one another. Any minor misalignment between the pintle axes and the reel openings may be accommodated by the tapered ends of the pintles and the arcuate pivoting of the pintles about pivot axes spaced slightly above the pintle axes. This alignment of the pintle axes with the reel opening is safely carried out in its entirety by power means thereby requiring no manual manipulation of the pintles by the machine operator.

When the reel openings have been fully engaged by the pintles, the pintle assemblies, or preferably the housing assemblies, are simultaneously raised vertically a distance sufficient to lift the reel from the floor or other support surface. With the reel suspended above the floor, one or both pintles may optionally be moved horizontally to their zero or centered positions to "true up" the reel openings into substantial alignment with the reel axis. The left and right housing assemblies may then be raised on their respective masts to position the reel axis at approximately the preferred elevation for payout of a cable from the reel. The pintle assemblies are then operated to raise the pintles into engagement with recesses in the housing side plates to lock the pintles into their aligned positions for cable payoff. As the pintles engage in their respective recesses a pair of swivel pads on each pintle assembly engages a pivotable locking arm assembly for each housing and urges it into positive locking engagement with the mast associated with that housing to prevent vertical slippage of the housing assembly relative to the mast and to relieve the stress on the power means for vertically raising the housing relative to the mast.

In the preferred embodiment of the invention, the power means comprise high torque electrical gearmotors or motor/gear reducer combinations with drive screw and drive nut arrangements for more accurate positioning of the housing assemblies, pintle assemblies and pintles than would otherwise be possible with, for example, hydraulic power means. One of the pintle assemblies is provided with a brake assembly which is engageable with one of the reel flanges so that cable payout can be controlled by braking the rotation of the pintle thereby maintaining a desired degree of tension on the cable as it pays off the reel. If desired, the braking assembly may also be used in connection with a drive means for rotating the pintle so that the cable payoff apparatus of the invention may be used as a cable take up apparatus as well as a payoff apparatus. Each base assembly is provided with a pair of wheels mounted to a drive axle. One or both of the wheels may be flanged for engaging with one or a pair of rails for guiding the apparatus along a given path of travel. A drive motor is provided on one base assembly and is connected to the wheel shaft for that assembly by a drive sprocket and roller chain arrangement so that the entire apparatus may be moved across the floor or along the path of travel of the rails.

With the foregoing and other advantages and features of the invention that will become hereinafter apparent, the nature of the invention may be more clearly understood by reference to the following detailed description of the invention, the appended claims and to the several views illustrated in the drawings.

DETAILED DESCRIPTION OF THE INVENTION

Figure 1:
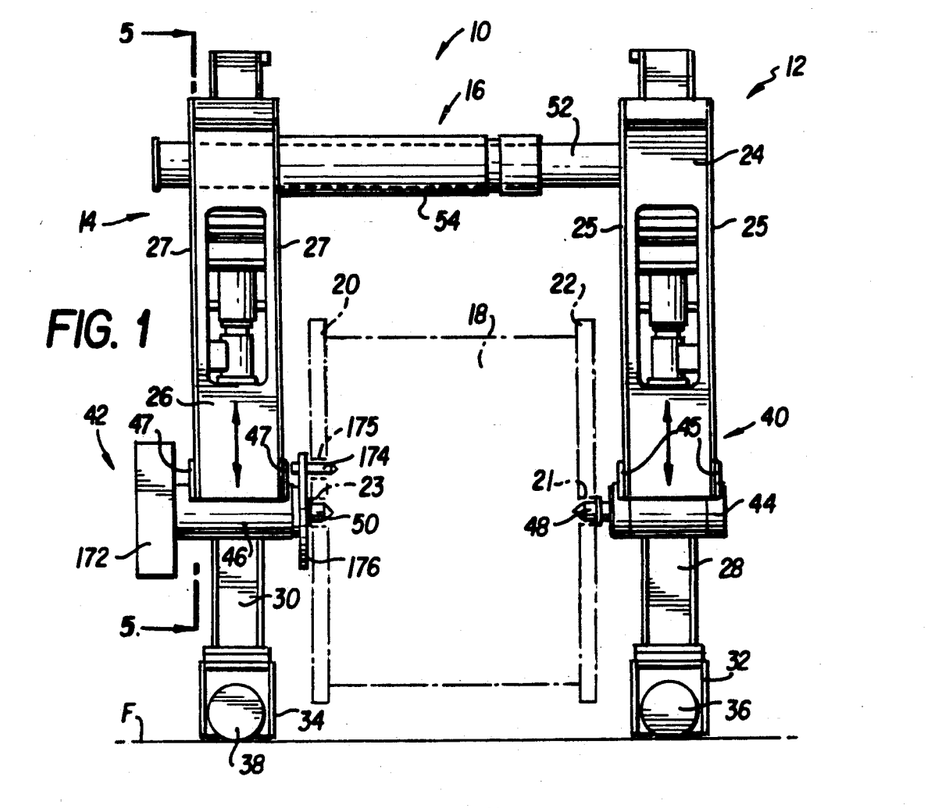
FIG. 1 is a front elevation view of the cable payoff apparatus of the present invention.
Figure 2:
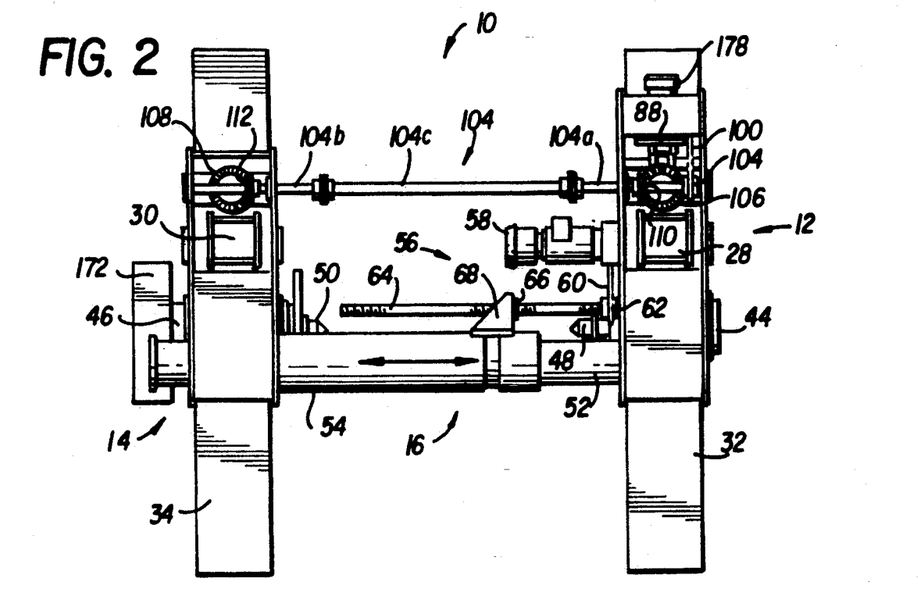
FIG. 2 is a top plan view of the apparatus of the invention.
Figure 3:
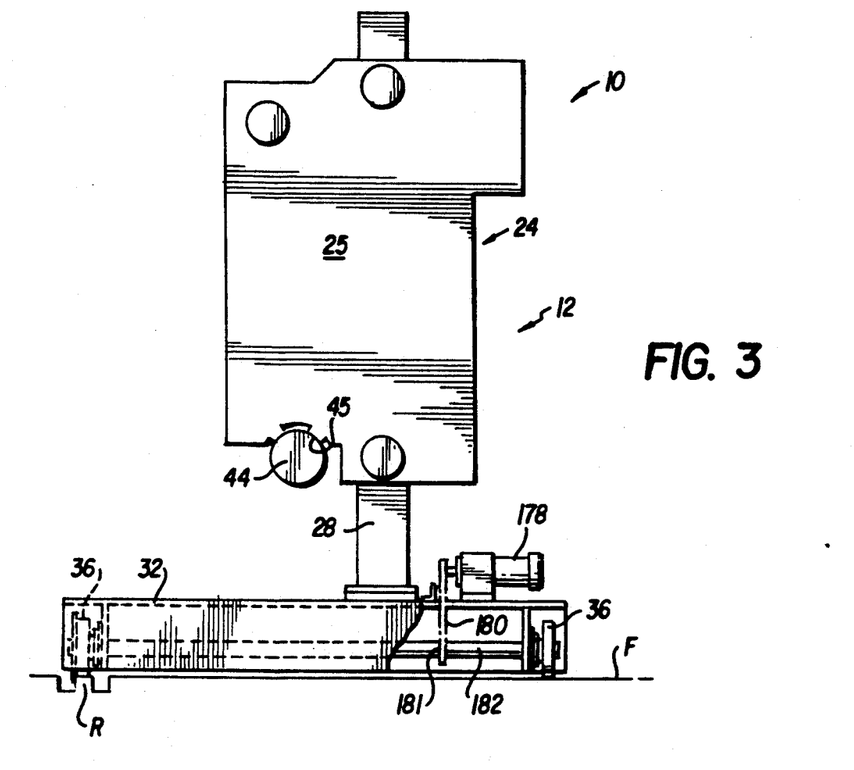
FIG. 3 is a side elevation view, partly in cross-section, of the apparatus of the present invention.

Referring now in detail to the drawings, there is illustrated in FIGS. 1-3 a cable payoff apparatus according to the present invention, which is designated generally by reference numeral 10. The apparatus 10 has a right hand portion 12 and a left hand portion 14 which are movable toward and away from one another by means of a portal traverse assembly 16. A reel 18 of cable shown in phantom lines in FIG. 1 is supported for payoff in a manner to be described between the right and left hand portions 12, 14 of the apparatus 10 and includes a pair of spaced reel flanges 20, 22 with central openings 21, 23 which define the reel axis.

The right and left hand portions 12, 14 each comprise a respective right portal or housing assembly 24 and a left portal or housing assembly 26 mounted for up-and-down vertical movement on a respective upstanding mast 28, 30. The masts 28, 30 are supported on respective base assemblies 32, 34 which are movable across a supporting surface or floor F on wheels 36, 38. Each housing assembly 24, 26 supports a respective right and left pintle assembly 40, 42 from which are suspended pintles or pintle sleeves 44, 46 having tapered pintle shafts 48, 50 which are engageable in the central openings 21, 23 in the flanges 20, 22 of the reel 18. Pintle shafts 48, 50 are preferably rotatably mounted in pintle sleeves 44, 46 by means of spaced anti-friction bearings, such as roller and ball bearings. In their uppermost positions, pintle sleeves 44, 46 are seated in arcuate recesses 45, 47 in the side plates 25, 27 of the housing assemblies 24, 26.

Referring now to FIG. 2, the portal traverse assembly 16 comprises a solid shaft 52 extending from the right housing assembly 24 into telescoping relation with a hollow shaft or tube 54 mounted to the left housing assembly 26. The telescoping shafts 52, 54 provide support for the right and left hand portions 12, 14 and telescope when the spacing between the portions 12, 14 is varied by the power means 56. Power means 56 comprises a helical gearmotor 58 mounted to the right housing assembly 24 and connected by a roller chain 60 and sprocket (not shown) to a sprocket 62 fixed to a helical drive screw 64 rotatably mounted to the right housing assembly 24 by means of anti-friction bearings. A fixed drive nut 66 is mounted in a bracket 68 affixed to hollow shaft 54 and drive screw 64 is threaded through drive nut 66. When it is necessary to increase or decrease the spacing between the right and left hand portions 12, 14 of the apparatus 10, the gearmotor 58 is operated in one direction or the other to cause the roller chain 60 to rotate drive screw 64 via sprocket 62. As screw 64 rotates in fixed nut 66, an axial force is generated which, those skilled in the art will appreciate, either urges the right and left hand portions 12, 14 apart or pulls them together, depending on the direction of rotation of the screw 64.

Figure 4:
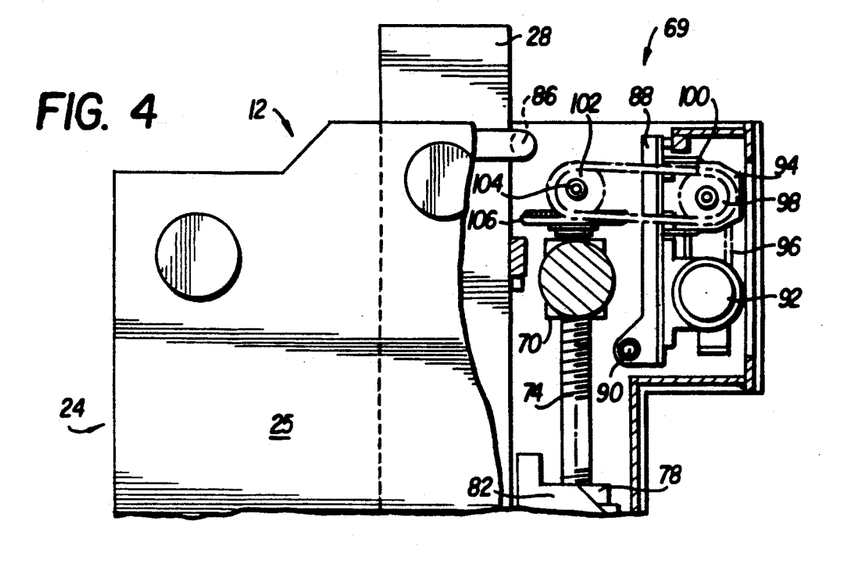
FIG. 4 is a fragmentary side elevation view, partly in cross-section, of the housing lift assembly mounted on the right housing.
Figure 5:
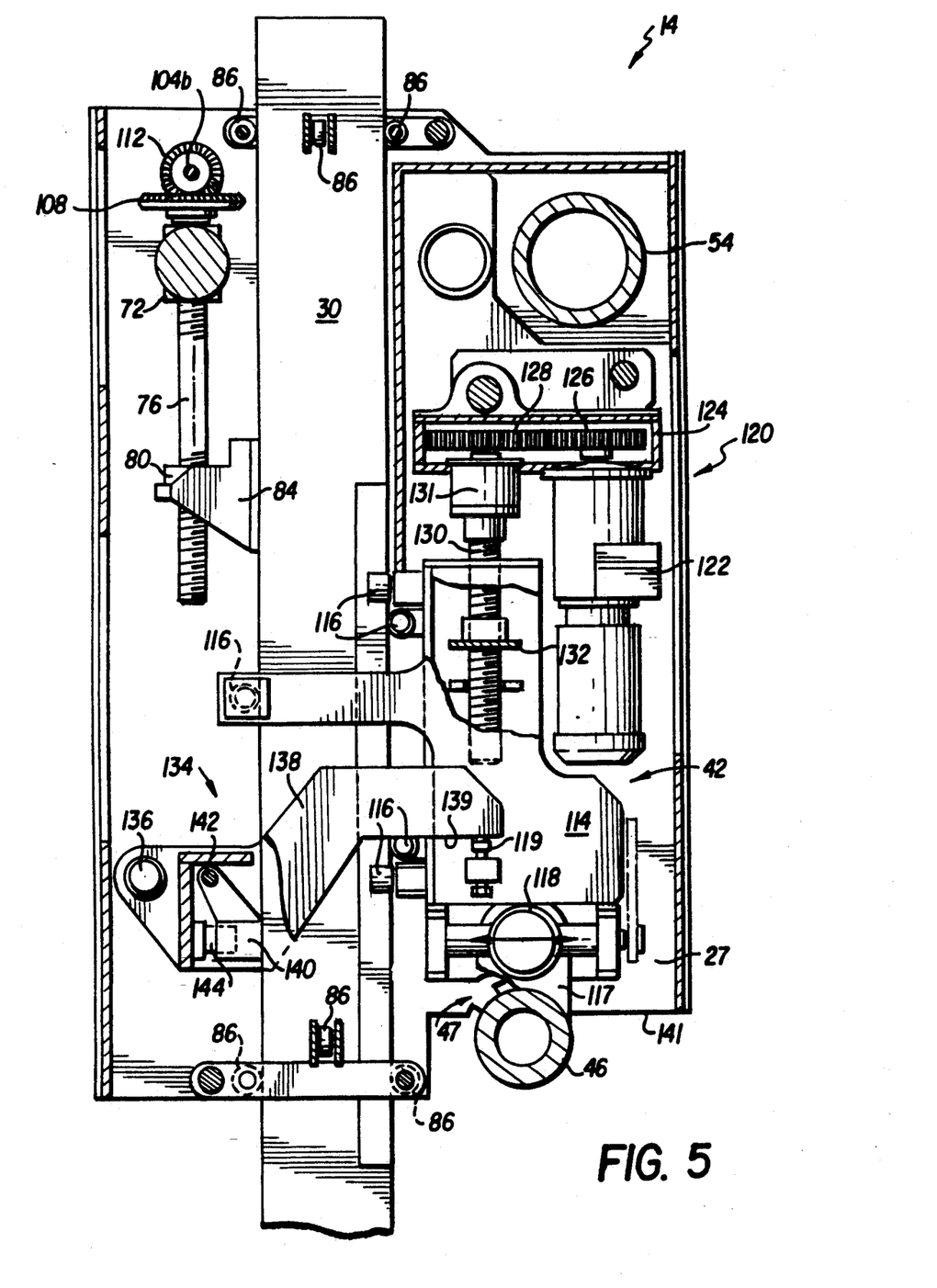
FIG. 5 is a side elevation view, partly in cross-section, of the left housing assembly of the apparatus of the present invention taken along line 5—5 of FIG. 1.

Now referring to FIGS. 2, 4 and 5, the operation of the housing lift assembly 69 will be described. Lift assembly 69 is connected to both the left and right housing assemblies 24, 26 for simultaneously raising and lowering the assemblies 24, 26. As shown in FIGS. 4 and 5, bearing housings 70, 72 are rigidly mounted to the frames of housing assemblies 24, 26 and rotatably support helical drive screw shafts 74, 76 which are threadably engaged with drive nuts 78, 80. Drive nuts 78, 80 are fixedly mounted to brackets 82, 84 which are welded or otherwise affixed to a respective mast 28, 30. As best seen in FIG. 5, the housing assembly 26 is rollably supported on the mast 30 by a plurality of cam rollers 86 which are mounted to the housing assembly for rolling engagement with the mast surfaces. The housing assembly 24 is rollably supported on its mast 28 with a similar roller arrangement (not shown). It will be appreciated that rotation of drive screws 74, 76 in drive nuts 78, 80 will cause a respective housing assembly 24, 26 to be raised or lowered vertically relative to the masts 28, 30.

Since it is important that the housing assemblies 24, 26 be vertically raised and lowered together, i.e., simultaneously, the drive screws 74, 76 must be rotated together at the same speed. This is accomplished by using a single drive means interconnected with both drive screws 74, 76 as is best illustrated in FIGS. 2 and 4. A mounting frame 88 is pivotally mounted to the housing assembly 24 on a shaft 90. A motor 92 and helical gear reducer 94 are mounted to the frame 88. The motor 92 drives the gear reducer 94 by means of a V-belt 96 and sheaves (not shown). A sprocket 98 on the output shaft of the gear reducer 94 drives a roller chain 100 which, in turn, drives a sprocket 102 fixed to a drive shaft 104 rotatably mounted to the housing assemblies 24, 26. Drive shaft 104 comprises two end sections 104a, 104b which telescope into a splined torque tube 104c (FIG. 2) to permit adjustment of the axial length of the shaft 104 when the housing assemblies 24, 26 are moved toward and away from one another by the portal traverse assembly 16. Fixed to the upper ends of the drive screws 74, 76 are respective bevel gears 106, 108 which mesh with bevel gears 110, 112 fixed respectively to shaft portions 104a, 104b.

Thus, when motor 92 is energized to rotate in one or the other direction, the V-belt 96 drives gear reducer 94 which, in turn, drives the sprocket 98, chain 100, and sprocket 102, thereby rotating shaft 104. Rotation of shaft 104 rotates bevel gears 110, 106 meshed with bevel gears 112, 108 and thus simultaneously rotates each drive screw 74, 76 an equal number of turns so that both housing assemblies 24, 26 are moved an equal vertical distance up or down on their respective masts 28, 30.

In FIG. 5 there is illustrated the left housing assembly 26 in which the left pintle assembly 42 is mounted for vertical reciprocating movement within the housing assembly. The right pintle assembly 40 is substantially identical to the left pintle assembly so that only one of such assemblies will be described herein. To the extent there are any differences in those assemblies that are important in understanding the invention, such differences will be described hereinafter. Pintle assembly 42 comprises a support frame 114 which is rollably supported for vertical movement on mast 30 by a plurality of cam rollers 116. Pintle 46 is pivotally suspended beneath frame 114 by links 117 from a shaft 118 which is horizontally reciprocable in the directions shown by the arrow in FIG. 5 by a mechanism described hereinafter in connection with FIGS. 6 and 7. A pair of vertically adjustable pads 119 (only one shown in FIG. 5) are mounted on opposite sides of the support frame 114 for a purpose to be described.

Pintle assembly 42 includes a pintle lift screw assembly 120 comprising a helical gearmotor 122 suspended in the housing assembly 26 from a lift screw housing 124. Gearmotor 122 drives a gear 126 meshed with a screw gear 128 which is fixed to a drive screw 130 rotatably mounted in a bearing housing 131. Drive screw 130 is threaded into a drive nut 132 fixed to the pintle support frame 114. When gearmotor 122 is energized to rotate in one direction or the other, drive screw 130 rotates in drive nut 132 and the pintle assembly 42 will be vertically moved up or down on mast 30.

A locking means 134 is pivotably mounted to the housing of housing assembly 26 by a shaft 136 and comprises a pair of locking arms 138 (only one shown) which extend past mast 30 on both sides thereof. A locking bar 140 pivotably mounted to the locking arms 138 by a locking bar shaft 142 engages one side of the mast 30. A plurality of polyurethane spring tubes 144 bear on the side of the locking bar 140 away from the mast 30 and are adapted to apply a large, but somewhat resilient, locking force to the mast in a manner to be described.

Assume the pintle assembly 42 is lowered to a position where the undersurface 139 of the locking arm 138 is disengaged from the pads 119. The cantilevered weight of the arms 138 will cause the locking bar 140 to bear against the edges of the mast 30 with a relatively slight pressure. Such pressure is not sufficiently great, however, to prevent vertical movement of the housing assembly 26 by means of the housing lift assembly 69, and drive screw 76. When pintle lift screw assembly 120 is operated to raise pintle assembly 42, the pads 119 will engage undersurfaces 139 of locking arms 138 and urge locking arms 138 counterclockwise as viewed in FIG. 5. Such counterclockwise urging will force locking bar 140 into tighter gripping engagement with the mast 30 under the resilient force of spring tubes 144 to thereby lock the housing assembly 26 to the mast 30 and prevent vertical movement or slippage of the housing assembly along the mast. At the same time, the pintle 46 will be raised into rigid, locking engagement with arcuate recesses 47 in the lower edge 141 of the side plates 27 of housing assembly 26.

Figure 6:
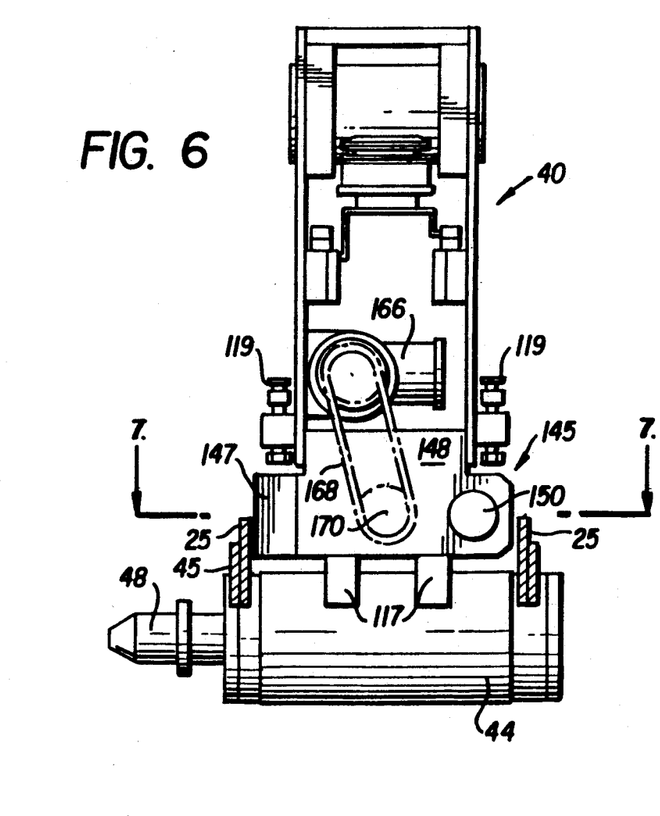
FIG. 6 is a front elevation view, partly in cross-section, of the right pintle assembly.
Figure 7:
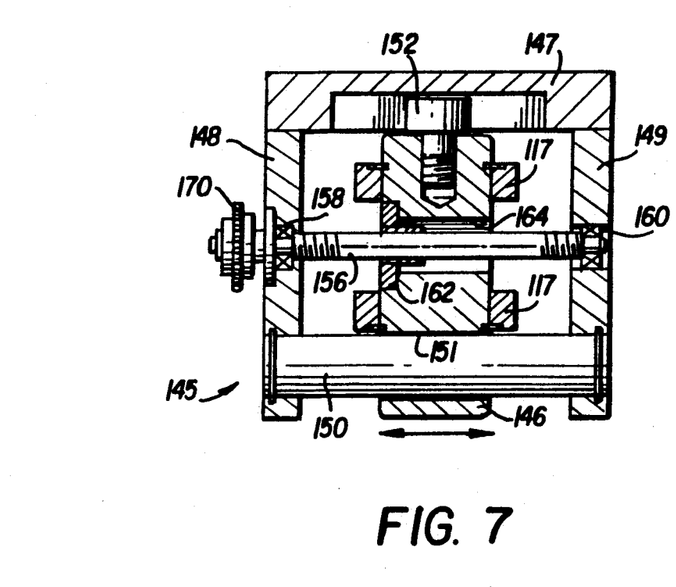
FIG. 7 is a cross-sectional view of the horizontal drive means for the pintle assembly taken along line 7—7 of FIG. 6.

With reference now to FIGS. 6 and 7, the mechanism for horizontal positioning of the pintles 44, 46 will be described with reference to the right pintle assembly 40 and pintle 44. The pintle 44 is pivotably suspended by a pair of links 117 from a pintle support assembly 145 mounted at the bottom of the pintle assembly 40. Pintle support assembly 145 includes a pintle support shaft 146 mounted so that its axis is translatable in a horizontal plane in the directions shown by the arrows in FIG. 7. The support assembly 145 comprises an end plate 147 and two side plates 148, 149 to the latter of which is mounted a pintle bearing shaft 150. Shaft 150 passes slidably through a bore 151 in one end of the pintle support shaft 146. A cam roller 152 is mounted axially to the other end of pintle support shaft 146 and is guided in a roller track 154 in end plate 147.

Horizontal movement of shaft 146 is achieved by a drive screw 156 which is rotatably mounted in bearings 158, 160 in respective side plates 148, 149. Drive screw 156 is threaded through a drive nut 162 mounted in a bore 164 in shaft 146. As drive screw 156 is rotated in drive nut 162, drive shaft 146 will move in one horizontal direction or the other as shown by the arrow in FIG. 7. Drive screw 156 is rotatably driven by a helical gearmotor 166 which drives a chain 168 and sprocket 170 fixed to the end of drive screw 156.

It will be appreciated by those skilled in the art that the various sprockets engageable with a roller chain may be torque limiting sprockets where appropriate. Similarly, those skilled in the art will be able to select from conventional off-the-shelf equipment appropriate gearmotors, electrical motors, bearings, drive nuts and screws etc. for carrying out the present invention.

Referring again to FIG. 1 it will be seen that the left hand pintle assembly 42 has a braking means 172 affixed to the outer end of the pintle shaft 50. A drive dog 174 is affixed to a drive arm 176 which is fixed to the inner end of pintle shaft 50. The drive dog 174 and braking means 172 are used to prevent overrunning of the reel 18 during payoff.

FIG. 3 illustrates the manner in which the apparatus 10 can be moved along the floor F under power. A drive motor 178 is mounted on base assembly 32 and drives a roller chain 180 which rotates a sprocket 181 fixed to axle 182. Rotation of axle 182 drives the wheels 36 and causes the apparatus 10 to travel transversely across the floor F. One or both of the wheels of each wheel pair 36, 38 on each axle may be flanged to engage one or two rails R set in the floor or other supporting surface.

The cable payoff apparatus 10 of the invention operates as follows. If the spacing between opposing pintle shafts 48, 50 is insufficient to accommodate a reel 18 of given width, the portal traverse assembly 16 is operated to cause the shafts 52, 54 to telescope outwardly and move the left and right hand portions 12, 14 of the apparatus 10 away from each other. A reel 18 is rolled to or otherwise positioned at a location resting on the floor F between the portions 12, 14 with the reel flanges 20, 22 confronting a respective pintle shaft 48, 50. Depending on the initial positioning of the pintles 44, 46 and the locations of the reel openings 21, 23 with respect thereto, the portal or housing lift assembly 69 and/or the pintle assemblies 40, 42 are operated to raise or lower the pintle shafts 48, 50 together or independently of one another to vertically align the pintle shafts with the reel openings at a position below the lower edges of the housing assemblies 24, 26. In this position, the pintle sleeves 44, 46 are free of the recesses 45, 47 and can pivot to a limited degree about the axes of their support shafts 146. The pintle support assembly 145 (FIGS. 6 and 7) for each pintle 44, 46 is then operated by means of gearmotor 166 to horizontally shift the axes of the pintle shafts 48, 50 independently of one another into a substantially horizontally aligned position with the reel openings 21, 23. In this condition, the pintle shafts 48, 50 are substantially aligned with the reel openings 21, 23 regardless of any distortion of the reel axis.

The portal traverse assembly 16 is then operated to telescope shafts 52, 54 inwardly and thereby cause the pintle shafts 48, 50 to enter a respective reel opening 21, 23 and to engage the drive dog 174 in a dog opening 175 in reel flange 20. The portal lift assembly 69 is then operated to raise the housing assemblies 24, 26 and thereby lift the reel 18 from the floor F to a position somewhat below the desired final height of the reel.

With the reel 18 suspended above the floor F, the lift screw assemblies 120 for the left and right pintle assemblies 40, 42 are operated to raise the pintle assemblies 40, 42 until the pintle sleeves 44, 46 engage in their respective recesses 45, 47 in the lower edges of the side plates 25, 27 of the housing assemblies 24, 26. In the event one or both of the pintle sleeves 44, 46 is horizontally offset from its respective recess 45, 47, the sleeve will pivot about shaft 146 to the extent necessary to engage in the recesses and cause the pintle shafts 48, 50 to be in axial alignment. Movement of the pintle sleeves 44, 46 into the recesses 45, 47 will "true up" the reel 18 and position the reel openings 21, 23 along a common axis with the pintle shafts 48, 50. It may be desirable to operate the support assembly 145 with gearmotor 166 to reposition the pintle sleeves 44, 46 directly beneath the respective recess 45, 47 before the pintle assemblies 40, 42 are raised to engage the pintle sleeves in the recesses. Such repositioning of the sleeves will "true up" the reel 18.

When the pintle sleeves 44, 46 engage firmly in the recesses 45, 47, the pads 119 of each pintle assembly 40, 42 engage the locking arms 138 as described above and positively lock the housing assemblies 24, 26 against vertical movement or slippage along the masts 28, 30.

It should be apparent from the foregoing description that the present invention provides significant advantages over the known apparatus, especially with regard to personnel safety.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Apparatus for winding and reeling cable upon a reel having reel openings disposed on a reel axis, said apparatus being adapted to rest upon a support surface and comprising:

first and second spaced housing assemblies;

first and second spaced housing assemblies for laterally moving the housing assemblies relative to said support surface;

first and second pintles each supported on a respective housing assembly; and first and second pintle power means each supported by a respective housing assembly, said first pintle power means being connected to said first pintle for moving such pintle vertically relative to the housing assembly associated therewith, said second pintle power means being connected to said second pintle for moving such pintle horizontally relative to the housing assembly associated therewith, said second pintle power means being independent of said lateral moving means, said raising and lowering means and said first pintle power means.

2. Apparatus according to claim 1, including means connected to the housing assemblies for simultaneously raising and lowering the housing assemblies relative to the support surface.

3. Apparatus according to claim 2, wherein said raising and lowering means comprises a first drive screw threadably engaged with a first drive nut and being connected to the first housing assembly, a second drive screw threadably engaged with a second drive nut and being connected to, the second housing assembly, and power lift means connected to said first and second drive screws for simultaneously rotating said drive screws.

4. Apparatus according to claim 3, including first and second masts for supporting a respective one of said first and second housing assemblies, said first and second drive nuts being affixed to a respective first and second mast.

5. Apparatus according to claim 3, wherein said power lift means comprises a longitudinally extensible shaft rotatably mounted to said first and second housing assemblies, said shaft being drivingly connected to said first and second drive screws and a motor for rotatably driving said shaft.

6. Apparatus according to claim 5, wherein said power lift means further includes bevel gears mounted to each drive screw and to said shaft, the bevel gears on the shaft being drivingly meshed with the bevel gears on the drive screws.

7. Apparatus according to claim 1 including first and second masts for supporting said first and second housing assemblies, respectively, means for rollably guiding each housing assembly for vertical movement along the mast associated therewith, first and second locking means pivotably mounted to said first and second housing assemblies for releasably locking each housing assembly against vertical movement on the mast associated therewith and means for engaging each of said first and second locking means.

8. Apparatus according to claim 7, wherein said means for engaging said first and second locking means comprises said first and second pintle power means.

9. Apparatus according to claim 1, wherein said means for laterally moving the housing assemblies comprises a telescoping support member and a drive screw and drive nut arrangement connected between one of said housing assemblies and said telescoping support member.

10. Apparatus according to claim 9, wherein said telescoping support member comprises a pair of telescoping shafts, said drive nut being affixed to one of said shafts and said drive screw being rotatably mounted to one of said housing assemblies and threadably engaged with said drive nut and motor means connected to said drive screw for rotating said drive screw.

11. Apparatus according to claim 1, wherein said first and second housing assemblies are supported on first and second base assemblies, and power moving means associated with at least one of said base assemblies for moving said apparatus over the support surface.

12. Apparatus according to claim 11, wherein said power moving means comprises a plurality of wheels rotatably mounted to said base assemblies, at least one of said wheels having an axle and motor means drivingly connected to said axle for rotating at least the wheel associated therewith.

13. Apparatus according to claim 1, wherein said pintles each comprise a pintle shaft rotatably mounted in a pintle sleeve and brake means connected to one of said rotatable pintle shafts for braking the rotation of such pintle shaft as a cable is payed off the reel.

14. Apparatus according to claim 13, including a drive arm affixed to said one pintle shaft and a drive dog fixed to said drive arm, said drive dog being adapted to engage a dog opening in said reel.

15. Apparatus according to claim 1, wherein each of said pintle power means comprises a first drive screw threadably engaged with a first drive nut for the vertical movement of the pintle and a second drive screw threadably engaged with a second drive nut for the horizontal movement of the pintle.

16. Apparatus according to claim 15, including recesses in said housing assemblies for receiving the pintles, each of said pintle power means being operative to position the pintles in first positions in substantial alignment with the reel openings of a reel supported by the support surface and in second positions fixedly engaged in said recesses.

17. Apparatus according to claim 16, including first and second masts for supporting said first and second housing assemblies, respectively, means connected to the housing assemblies for raising and lowering the housing assemblies vertically relative to the support surface, first and second locking means pivotably mounted to said first and second housing assemblies for releasably locking said housing assemblies against vertical movement along the mast associated therewith when said pintles are positioned in said second position.

18. Apparatus according to claim 1, including first and second masts for supporting a respective housing assembly, said first and second pintle power means each comprising a pintle support frame rollably supported on a respective mast, a first drive nut fixed to the pintle support frame, a first drive screw rotatably mounted to a respective housing assembly and threadably engaged with the first drive nut and a first motor means for rotating the first drive screw to thereby move the associated pintle vertically, said first and second pintle power means each further comprising a pintle support assembly mounted to the pintle support frame, a pivot shaft for pivotally supporting a respective pintle, means mounting said pivot shaft for horizontal movement, a second drive nut affixed to the pivot shaft, a second drive screw rotatably mounted to the pintle support assembly and threadably engaged with the second drive nut and a second motor means for rotating the second drive screw to thereby move the associated pintle horizontally.

19. Apparatus for winding and reeling cable upon a reel having reel openings disposed on a reel axis, said apparatus being adapted to rest upon a support surface and comprising:
   first and second spaced housing assemblies;
   means connected to said housing assemblies for laterally moving the housing assemblies toward and away from one another, said lateral moving means including a first longitudinally extensible shaft connected between said housing assemblies;
   means connected to the housing assemblies for simultaneously raising and lowering the housing assemblies relative to the support surface, said raising and lowering means comprising a first drive screw threadably engaged with a first drive nut and being connected to the first housing assembly, a second drive screw threadably engaged with a second drive nut and being connected to the second housing assembly;
   power lift means connected to said first and second drive screws for simultaneously rotating said drive screws, said power lift means comprising a second longitudinally extensible shaft rotatably mounted to said first and second housing assemblies, said second shaft being drivingly connected to said first and second drive screws and a motor for rotatably driving said shaft;
   first and second pintles each supported on a respective housing assembly; and
   first and second pintle power means each supported by a respective housing assembly and connected to a respective pintle for moving such pintle vertically and horizontally relative to the housing assembly associated therewith.

20. Apparatus according to claim 19, wherein said power lift means further includes bevel gears mounted to each drive screw and to said shaft, the bevel gears on the shaft being drivingly meshed with the bevel gears on the drive screws.

21. Apparatus for winding and reeling cable upon a reel having reel openings disposed on a reel axis, said apparatus being adapted to rest upon a support surface and comprising:

first and second spaced housing assemblies;

means connected to said housing assemblies for laterally moving the housing assemblies toward and away from one another;

first and second pintles each supported on a respective housing assembly; and first and second pintle power means each supported by a respective housing assembly, and connected to a respective pintle for moving such pintle vertically and horizontally relative to the housing assembly associated therewith, each pintle power means comprising a first drive screw threadably engaged with a first drive nut for the vertical movement of the pintle and a second drive screw threadably engaged with a second drive nut for the horizontal movement of the pintle.

22. Apparatus according to claim 21, including recesses in said housing assemblies for receiving the pintles, said pintle power means being operative to position the pintles in first positions in substantial alignment with the reel openings of a reel supported by the support surface and in second positions fixedly engaged in said recesses.

23. Apparatus according to claim 22, including first and second masts for supporting said first and second housing assemblies, respectively, means connected to the housing assemblies for raising and lowering the housing assemblies vertically relative to the support surface, first and second locking means pivotally mounted to said first and second housing assemblies for releasably locking said housing assemblies against vertical movement along the mast associated therewith when said pintles are positioned in said second position.

24. Apparatus for winding and reeling cable upon a reel having reel openings disposed on a reel axis, said apparatus being adapted to rest upon a support surface and comprising:

first and second spaced housing assemblies;

first and second masts for supporting a respective housing assembly;

means connected to said housing assemblies for laterally moving the housing assemblies toward and away from one another;

first and second pintles each supported on a respective housing assembly; and first and second pintle power means each supported on a respective housing assembly and connected to a respective pintle for moving such pintle vertically and horizontally relative to the housing assembly associated therewith, said first and second pintle power means each comprising a pintle support frame rollably supported on a respective mast, a first drive nut fixed to the pintle support frame, a first drive screw rotatably mounted to a respective housing assembly and threadably engaged with the first drive nut and first motor means for rotating the first drive screw to thereby move the associated pintle vertically, said first and second pintle power means each further comprising a pintle support assembly mounted to the pintle support frame, a pivot shaft for pivotally supporting a respective pintle, means mounting said pivot shaft for horizontal movement, a second drive nut affixed to the pivot shaft, a second drive screw rotatably mounted to the pintle support assembly and threadably engaged with the second drive nut and a second motor means for rotating the second drive screw to thereby move the associated pintle horizontally.

25. Apparatus for winding and reeling cable upon a reel having reel openings disposed on a reel axis, said apparatus being adapted to rest upon a support surface and comprising:

first and second spaced housing assemblies;

first and second masts for supporting a respective housing assembly;

means connected to said housing assemblies for laterally moving the housing assemblies toward and away from one another;

first and second pintles each supported on a respective housing assembly;

first and second pintle power means each supported by a respective housing assembly and connected to a respective pintle for moving such pintle vertically and horizontally relative to the housing assembly associated therewith;

means for rollably guiding each housing assembly for vertical movement along the mast associated therewith;

first and second locking means pivotably mounted to said first and second housing assemblies for releasably locking each assembly against vertical movement on the mast associated therewith; and means for engaging each of said first and second locking means, said means for engaging said first and second locking means comprising said first and second pintle power means.

26. Apparatus for paying off a cable from a reel having reel openings disposed on a reel axis, comprising:

first and second upstanding masts;

first and second spaced housing assemblies mounted for vertical movement along a respective mast;

first power means independent of said first, second and third power means and supported on each housing assembly for moving the associated pintle horizontally relative to such housing assembly independently of the vertical movement of the associated pintle by the third power means, and independently of the lateral and vertical movement of the housing assemblies by the first and second power means.

27. Apparatus according to claim 26, including recess means on said housing assemblies for receiving the pintles, said third power means being operative to position the pintles in first positions in substantial alignment with the reel openings of a reel and in second positions fixedly engaged in said recess means.

* * * * *